Figure 3:
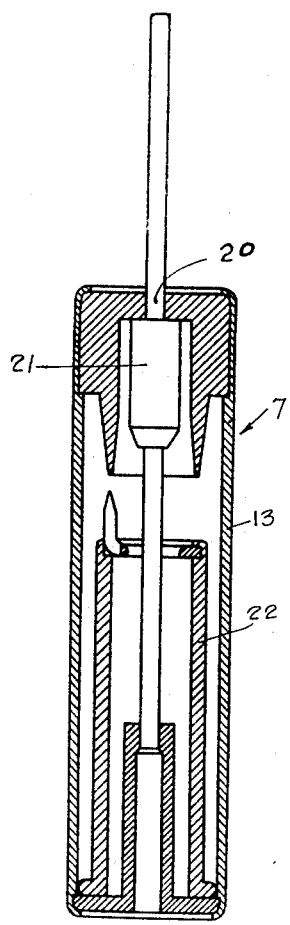

Dec. 23, 1958 A. D. COULSON 2,866,099
RADIATION INDICATOR AND ELECTRICAL SWITCHING
DEVICE FOR USE THEREIN
Filed Dec. 6, 1955 2 Sheets-Sheet 1
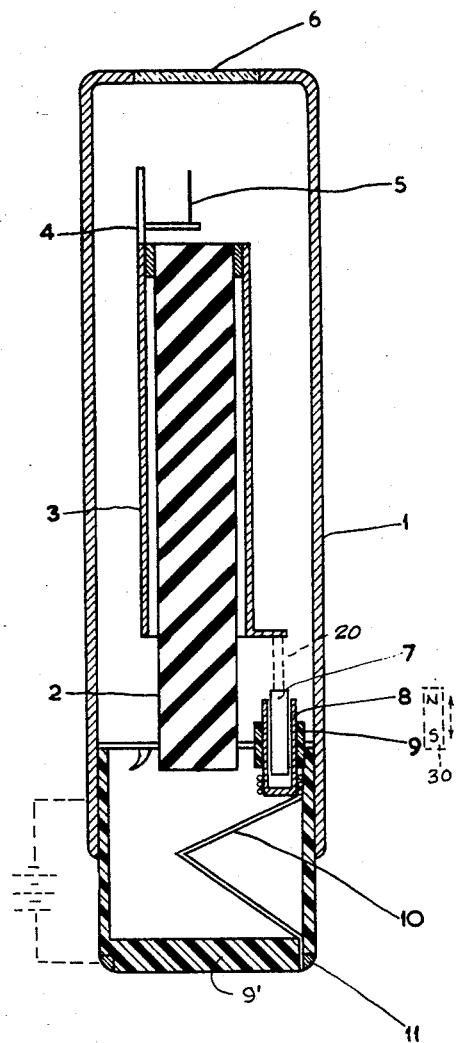
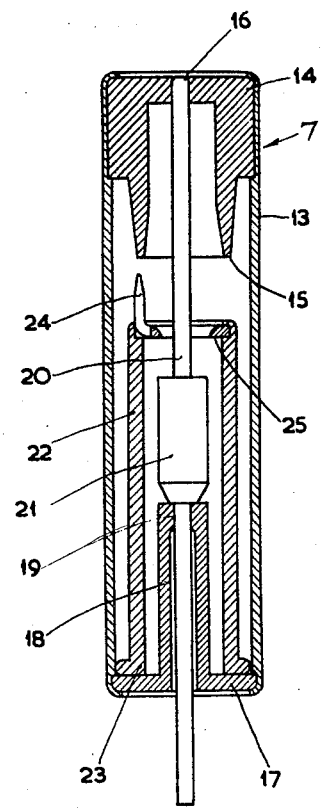
INVENTOR
ARTHUR DESMOND COULSON
BY
AGENT Dec. 23, 1958  A. D. COULSON  2,866,099
RADIATION INDICATOR AND ELECTRICAL SWITCHING
DEVICE FOR USE THEREIN
Filed Dec. 6, 1955  2 Sheets-Sheet 2

INVENTOR
ARTHUR DESMOND COULSON
BY
AGENT

United States Patent Office 2,866,099
Patented Dec. 23, 1958

2,866,099

RADIATION INDICATOR AND ELECTRICAL SWITCHING DEVICE FOR USE THEREIN

Arthur Desmond Coulson, Kingswood, Tadworth, England, assignor, by mesne assignments, to North American Philips Company, Inc., New York, N. Y., a corporation of Delaware Application December 6, 1955, Serial No. 551,452

Claims priority, application Great Britain December 7, 1954

12 Claims. (Cl. 250—83.3)

This invention relates to radiation indicating devices and to electrical switching devices for use in said indicating devices.

A radiation indicator for biologically active corpuscular or electromagnetic radiation may comprise an indicating instrument and a contact device or electrical connector or switch in the measuring voltage supply circuit. By establishing the contact, the voltage is supplied to the indicating instrument, for example an electrometer. When the instrument has been charged, the contact is broken and the indicator is ready for use. Thereafter the contact must not be reestablished, except when the instrument must be recharged.

Such radiation meters usually are intended for personal use and may be carried in a variety of positions. The switching device must be such that it is not rendered operative inadvertently. This can be achieved by a suitable design of the switching device, so that it can establish the contact in a predetermined position of the radiation meter only. According to the invention, for this purpose the switching device or electrical connector has a slidable pin for bridging an interruption in the circuit, while means are provided for preventing the movement of the pin, which means are rendered inoperative in a predetermined position of the meter or indicator.

In a suitable switching device for use in the radiation indicator in accordance with the invention, the slidable pin can move in the direction of its length and may be provided with a thickened or enlarged portion arranged within a cylindrical tiltable sleeve surrounding the pin, the sleeve being provided with a rim which is bent inwards leaving an aperture through which the thickened portion can just pass. The thickened portion is enabled to pass only when the axis of the sleeve coincides with the pin axis. The sleeve is arranged so that this condition is satisfied in a predetermined position of the radiation indicator only, whereas in all other positions the thickened portion of the pin engages the rim of the sleeve, so that the pin cannot be displaced.

The preferred position in which the switching device can be rendered operative, is that in which the axis of the pin is approximately vertical and the axial movement of the contact pin is directed upward. Positioning of the meter at another angle causes the sleeve to tilt, so that the sleeve and the pin are not coaxial and the rim of the sleeve arrests the pin due to the fact that the thickened portion, which is designed as a collar, cannot pass through the aperture in the sleeve. Preferably the pin is made of non-magnetic material, while the thickened portion may be a collar of ferromagnetic metal, which enables the pin to be displaced by means of a magnet which is moved upward along the indicator and externally thereof.

Figure 4:
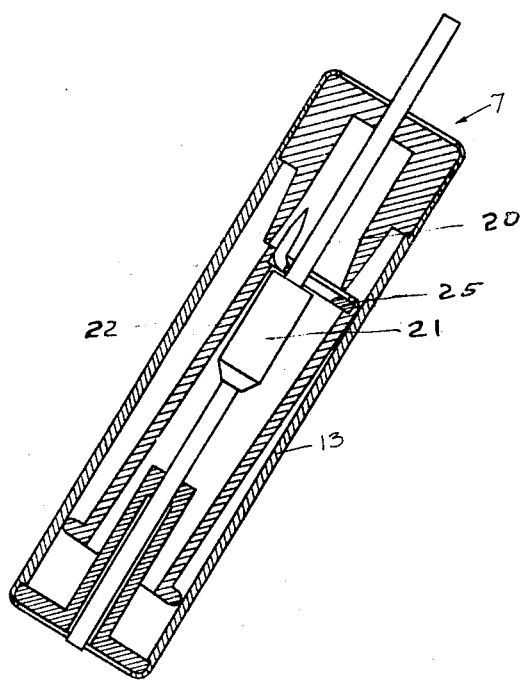

The invention will now be described in greater detail with reference to the accompanying drawings in which:

Fig. 1 shows a radiation indicator provided with a contact device in accordance with the invention, and Figs. 2, 3 and 4 are sectional views of the switching device.

The radiation indicator comprises an evacuated housing 1, within which an electrode 3 is arranged, which is supported by an insulator 2, which may be made of quartz. The electrode 3 has an extended portion 4, which supports a quartz fibre 5. The housing 1 is provided with a transparent window 6 through which the quartz fibre can be viewed.

The space within the housing 1 also contains a switching device or electrical connector 7, which is held in a tube 8 secured to the wall of the housing 1 by means of an annular insulator 9. Through a conductor 10, the sleeve 8 is electrically connected to a metal ring 11, which is arranged on the bottom of the housing 1 and insulated from the housing-wall by a member 9'. A potential difference, for example, the voltage of a battery shown in phantom, can be applied between the ring 11 and the wall 1 of the housing. By means of the switching device 7 the supply conductor 10 is connected to the electrode 3, so that the latter is charged and, as a result, the quartz fibre 5 moves away from the extended portion 4. Changes in the deflection of the quartz fibre 5, after the charging current has been interrupted by the switching device, provide an indication of the amount of rays incident on the apparatus. Since false indications are produced when the switching device establishes intermittent contacts, the device must be so constructed that no accidental contact can be established in the operation of the radiation indicator.

The switching device 7, which is shown in greater detail in Fig. 2, comprises a metal casing 13, which is closed at the top by a member 14, which is provided with an annular knife edge 15 and with a central aperture 16 to accommodate a contact pin 20. At the bottom the casing 13 is closed by a member 17, which is secured to a guide-sleeve 18 having an aperture 19 through which the pin 20 can be guided. The pin 20 is made of non-magnetic material and is provided with a collar or enlarged portion 21 made of ferromagnetic material. A sleeve or tube 22, which is provided at the bottom with a flange 23 and at the top with a projecting pointed needle 24, surrounds the part of the contact pin 20 carrying the collar 21 and is supported from the bottom part 17 so as to be free to move. Both the sleeve 22 and casing 13, as shown, are right-circular cylinders. The top of the sleeve has an internally projecting rim 25 which surrounds an aperture through which the collar 21 can just pass. The sleeve 22 can tilt with the casing 13, and when the sleeve 22 is not coaxial with the contact pin 20, the collar 21 cannot pass through the aperture and the rim 25 prevents the pin 20 from being moved through a distance sufficient for the contact or electrical connection to be established. This connection is to be made from the ring 11 through the conductor 10 to the holder 8, from the latter to the casing 13 and members 14 and 18 to the contact pin 20, and, as shown in phantom in Fig. 1, from the contact pin 20 to the electrode 3.

Fig. 2 shows the position of the switching device in which the sleeve 22 and the contact pin 20 are coaxial, so that the pin 20 can be lifted by means of an external, annular magnet 30, as shown in phantom, the collar 21 being moved upward through the aperture bounded by the rim 25.

Fig. 3 shows the device with extended switching pin. The switching device is so arranged in the radiation indicator shown in Fig. 1 that in this position the pin 20 comes into contact with the electrode 3 and completes the charging circuit.

When the switching device or the radiation indicator is inclined, the sleeve 22 tumbles or tilts to one side and the aperture of passage for the collar 21 is inclined so that the collar engages the rim 25 when an attempt is made to move the pin 20. This condition is shown in Fig. 4.

When the switching device is inverted, so that the end of the contact pin 20, which must be brought into contact with the electrode 3 in order to complete the circuit, extends downward, the sleeve 22 always prevents the required displacement of the pin 20 and thus an inadvertent connection. The end of the sleeve 22 provided with the internally projecting rim 25 is then pushed aside because of the fact that the needle 24 slides over the knife or sharp edge 15. Hence it is not possible for the pin 20 to extend sufficiently by its own weight to complete the circuit. By the use of the switching device in accordance with the invention, it is avoided with a sufficient degree of certainty that the contact pin establishes an unwanted contact with the electrode 3 in any position which the radiation indicator may assume in its operation.

What is claimed is:

1. A radiation-indicating device comprising radiation-responsive means, and means for making electrical connection to said radiation-responsive means, said electrical-connection-making means including movable conductive means making said electrical connection when occupying a given position, and means responsive to the position of the radiation-indicating device for preventing said movable means from occupying said given position unless said device occupies a predetermined position.

2. A radiation-indicating device comprising voltage-operable, radiation-detecting means, and means for selectively making connection between said detecting means and a source of voltage to render the former operable, said selective means being actuable to make said connection only when said device occupies a given position, and means actuable when said device occupies any other position to prevent said selective means from making said connection.

3. A radiation-indicating device comprising voltage-operable, radiation detecting and indicating means, and means for selectively making connection between said detecting means and a source of voltage to render the former operable, said selective means including a normally-open electrical circuit and a sliding contact pin for closing said circuit when occupying one of two extreme positions, and means including a hollow tubular member surrounding the pin and arranged substantially coaxially therewith for preventing said pin from occupying said one extreme position except when the radiation-indicating device occupies a given position.

4. A device as set forth in claim 3, wherein the tubular member is tiltable relative to the pin.

5. A device as set forth in claim 4 wherein the contact pin has an enlarged portion, and the tubular member has an aperture through which the enlarged portion of the contact pin may pass only when the tubular member and the contact pin are perfectly coaxial.

6. A device as set forth in claim 5 wherein the enlarged portion is ferromagnetic.

7. A device as set forth in claim 4 wherein a tubular housing encloses the tubular member and contact pin and extends substantially coaxially therewith, said housing and member being right circular cylinders.

8. A device as set forth in claim 4 wherein a housing having an internal annular sharp edge surrounds the tubular member, and a pointed member secured to the tubular member faces the sharp edge, said sharp edge and pointed member cooperating to prevent said contact pin from occupying said one position when the device is inverted 9. An electrical connector switching device comprising a housing, a movable contact member having two extreme positions, and means actuable by the position of said device for preventing said contact member from reaching and occupying one of said extreme positions except when said device occupies a given position.

10. A device as set forth in claim 9 wherein the preventing means includes a hollow, tubular, tiltable member surrounding the contact member.

11. A device as set forth in claim 10 wherein the contact member is a pin having an enlarged portion, and the tubular member includes an aperture for receiving said enlarged portion.

12. An electrical switching device comprising a housing having an internally-projecting sharp edge, a contact pin having an enlarged portion and movable within the housing between two extreme positions including one position wherein said pin projects from the housing, and a hollow, tubular, tiltable member surrounding the contact pin and having a pointed portion facing the sharp edge and an aperture for receiving the said enlarged portion, said tiltable member being movable within said housing and preventing the contact pin from reaching and occupying the said one position except when said device as a whole occupies a predetermined position.

References Cited in the file of this patent

UNITED STATES PATENTS

| | | |
|---|---|---|
| 2,598,215 | Borkowski et al. | May 27, 1952 |
| 2,741,706 | Futterknecht | Apr. 10, 1956 |
| 2,741,707 | Futterknecht | Apr. 10, 1956 |